S. R. McKAY.
VEHICLE WHEEL.
APPLICATION FILED JUNE 7, 1915.

1,179,123.

Patented Apr. 11, 1916.
2 SHEETS—SHEET 1.

Inventor
Stewart R. McKay.
by Thurston & King
attys.

S. R. McKAY.
VEHICLE WHEEL.
APPLICATION FILED JUNE 7, 1915.

1,179,123.

Patented Apr. 11, 1916.
2 SHEETS—SHEET 2.

Inventor
Stewart R. McKay
by Thurston & Bates
atty.

UNITED STATES PATENT OFFICE.

STEWART R. McKAY, OF EAST CLEVELAND, OHIO.

VEHICLE-WHEEL.

1,179,123.  Specification of Letters Patent.  Patented Apr. 11, 1916.

Application filed June 7, 1915. Serial No. 32,483.

*To all whom it may concern:*

Be it known that I, STEWART R. McKAY, a citizen of the United States, residing at East Cleveland, in the county of Cuyahoga and State of Ohio, have invented a certain new and useful Improvement in Vehicle-Wheels, of which the following is a full, clear, and exact description.

This invention relates to means for holding a demountable rim on a wheel.

The object of the invention is to provide a wheel with efficient clamping devices for this purpose which, without being detached from the wheel, may be quickly moved from one to the other of the two positions they may occupy, viz., the position in which they may firmly clamp a rim on the wheel, and the position in which they permit a rim to be put on or taken from the wheel.

The invention involves the employment upon a wheel, of a plurality of clamping devices, each of which comprises one jaw which may be fixed or movable upon the wheel according to fancy, a second jaw which is mounted upon the wheel but must be movable in a substantially radial direction between the clamping position and the non-clamping position, and a movable bolt and its associated nut, which when the bolt is in one position serves the double purpose of holding the movable jaw in clamping position and against radial movement, and also moving said movable jaw toward the other jaw to clamp the interposed rim; and which, when the bolt is in the other position, permits the movable jaw to move to the non-clamping position but still holds it attached to the wheel.

The accompanying drawings show this primary invention in several specific forms, and also shows several adjunctive novel features of construction, and these are all hereinafter described and pointed out in the appended claims.

Figure 1:
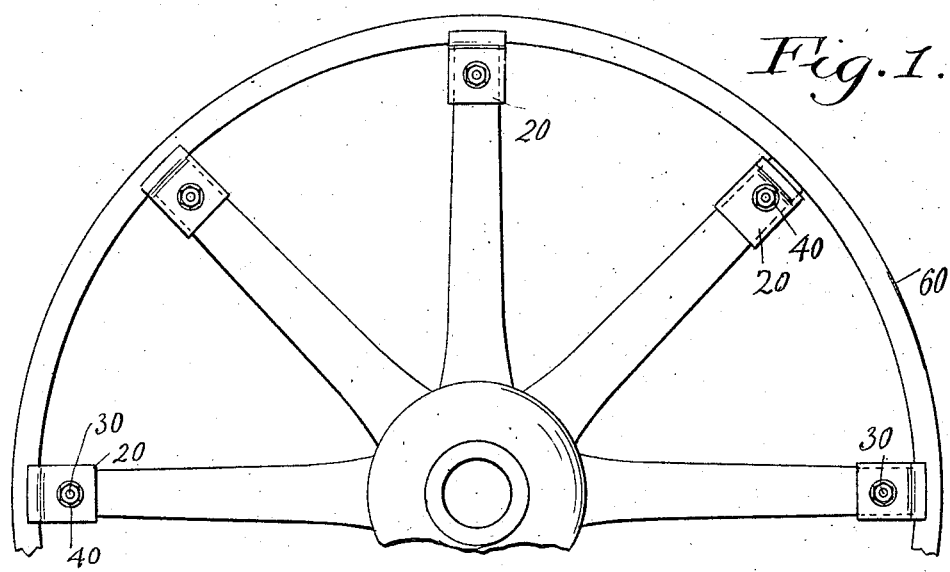
Figures 2, 3:
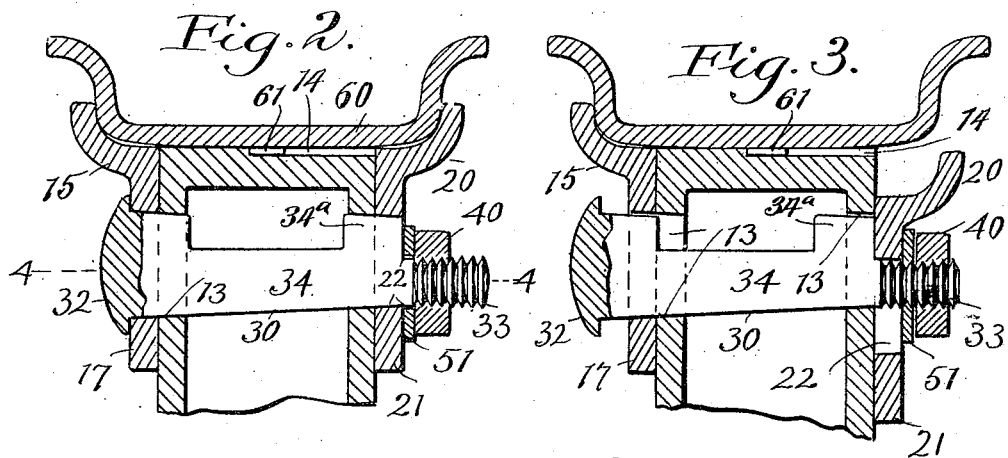
Figure 4:
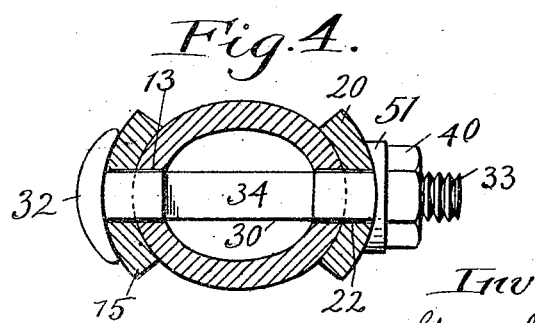
Figure 5:
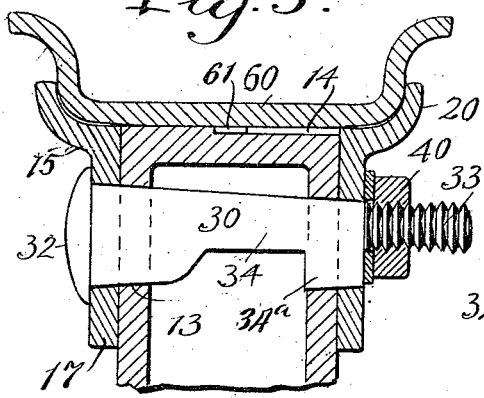
Figure 6:
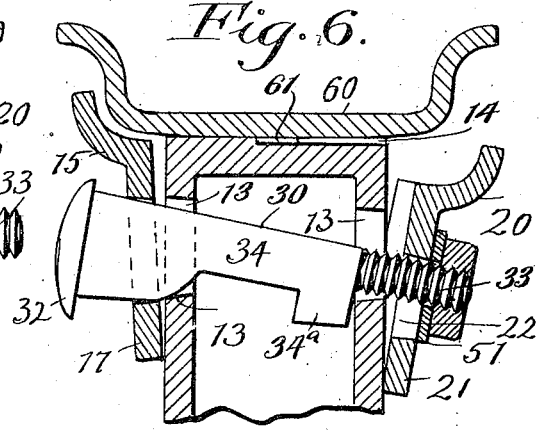
Figure 7:
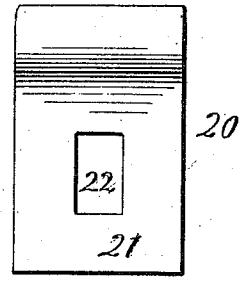
Figure 8:
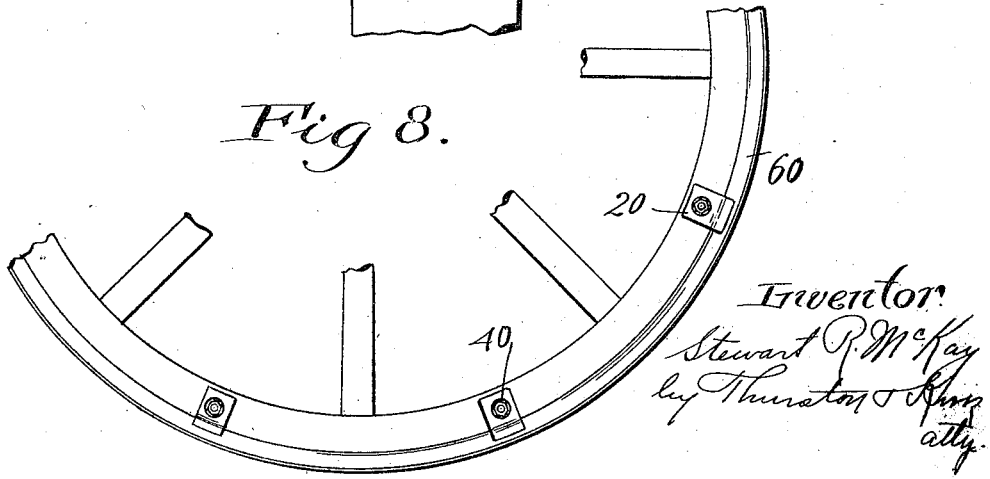

In the drawing, Figure 1 is a side elevation of a part of a wheel having the clamping devices mounted upon the ends of its spokes. Fig. 2 is a section crosswise of the wheel but lengthwise of the outer end of the spoke, showing the invention in its preferred form, and when the movable jaw is in the clamping position. Fig. 3 is a similar view showing the position of the parts when the movable jaw is in the rim releasing position. Fig. 4 is a sectional view of one of the spokes, said section being in a plane on line 4—4 on Fig. 2. Fig. 5 is a radial transverse section through the outer end of one spoke, showing the invention applied thereto in a different specific form,— the movable jaw being shown in the clamping position. Fig. 6 is a similar view of the same construction showing the movable jaw in the rim releasing position; Fig. 7 is a side elevation of one of the movable jaws; Fig. 8 is a side elevation of a part of a wheel having a felly, and having the invention in another specific form applied to said felly, and Fig. 9 is a radial sectional view through said felly and clamping devices.

Each clamping device consists of two clamping jaws 15 and 20, the bolt 30 and the coöperating nut 40, which screws onto the threaded stem 33 of said bolt. The clamping jaw 15, when in operative position, extends out from the wheel so that it may engage one side of the rim 60; and it is shaped so as to properly fit against said rim. This jaw may be immovably fixed to the wheel, and is shown in Figs. 2 and 3 rigidly connected with a spoke. Or said jaw may be movably mounted on the wheel, in which event the bolt will go through its shank 17 so that it may move it to and hold it in the clamping position,—this construction being shown in Figs. 5 and 6. Or this jaw may be rigid with the bolt and movable with it as shown in Fig. 9.

Figure 9:
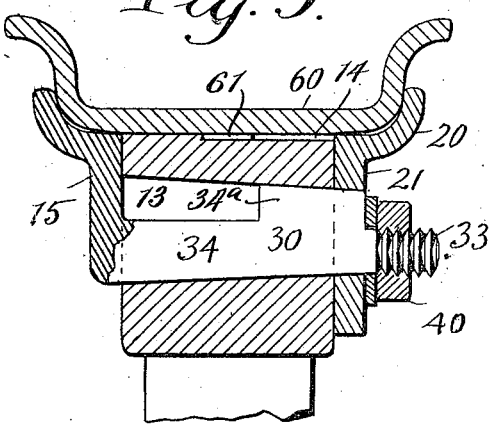

The clamping jaw 20 is movably mounted on the wheel and may occupy the clamping position shown in Figs. 2, 5 and 9; or it may occupy the rim releasing position as shown in Figs 3 and 6; and it is movable in a substantially radial direction toward and from the axis of the wheel from one of these positions to the other. This jaw has a shank 21 in which is a hole 22 shaped to fit that part of the bolt 30 which is in said hole when the jaw is in the clamping position.

The bolt 30 is mounted on the wheel in a transverse hole 13 to which it is fitted. This bolt has a head 32 at one end, and a threaded stem 33 at the other end. The intermediate body 34 of the bolt is preferably rectangular in cross section, more especially as to the part 34ª which lies in the slots 13 and 22, when the jaw 20 is in the rim holding position. Therefore, the hole 13 in the wheel and the hole 22 in the shank of the jaw 20 are radially elongated and are shaped to fit the part 34ª of the bolt which lies in said holes when the parts are in the rim clamping position.

In the construction shown in Figs. 2 and 3, the threaded stem 33 projects from the end of the body near the inner edge of the latter, that is, the edge nearest the axis of the wheel. When the movable jaw is in the clamping position (as shown in Figs. 2, 5 and 9), it is held there against radial movement by the engagement of two pairs of shoulders. One pair of these shoulders consists of the inner end of the hole 13, and the inner edge of the part of the bolt body which is in said hole when the bolt is in that position it must occupy to hold the movable jaw in the clamping position. By "inner" surfaces is meant surfaces nearest the axis of the wheel. By the engagement of these shoulders any movement of the bolt toward the axis of the wheel is prevented. The other pair of shoulders are the outer end of the hole 22 in the jaw shank and the outer edge of that part of the body which is in said hole when the jaw is in the clamping position. When these two last named shoulders are engaging, inward movement of the jaw 20 relative to the bolt is prevented. When the parts are in the described relative positions the nut 40 may be screwed up, thereby moving the jaw 20 toward the jaw 15, and to such an extent that the interposed demountable rim 60 will be clamped between said jaws. A washer 51 may be placed on the stem of the bolt between the jaw shank and the nut. To release the rim from this clamping action and to cause the inward movement of the movable jaw to the rim releasing position, (as shown in Figs. 3 and 6) one unscrews the nut far enough, and then moves the bolt 30 endwise toward the opposite side of the wheel to that on which the movable jaw is. The effect of doing this will be to disengage one or the other of the two pairs of shoulders referred to, and thereby the movable jaw will be permitted to move to said rim releasing position. In the construction shown in Figs. 2, 3 and 9, said endwise movement of the bolt withdraws the part 34ª of the bolt body from the slot 22 in the jaw shank and thereby disengages the shoulders formed by the outer edge of the bolt body and outer edge of the slot 22 in the jaw shank, but without causing the disengagement of the other pair of shoulders. Thereafter, as stated, the movable jaw may be moved to the rim releasing position, and in so moving it moves independently of the bolt.

In the construction shown in Figs. 5 and 6, the bolt shown is very nearly identical with that shown in Figs. 2 and 3, but it is inverted. When, therefore, it is moved endwise toward the fixed jaw it is the shoulder on the inner edge of the bolt which is disengaged from the coöperating shoulder formed by the inner edge of the hole 13 in the spoke. Therefore, in this case, the inward movement of the movable jaw is accompanied by a similar movement of the bolt. Attention is called to the fact that when the movable jaw has been released and moved to the rim releasing position it is not disconnected from the wheel, but is held thereon by the bolt and nut. The surface of the jaw shank which engages the spoke is concave to fit the surface of the spoke; and because of this the jaw, when in the rim releasing position does not turn on the bolt, but keeps the position shown in Figs. 3 and 6, so that it has a straight sliding movement only as it moves to the rim clamping position. Therefore, to restore said movable jaw to the rim clamping position one has merely to move it out to that position and pull the bolt endwise until the two pairs of shoulders referred to are in engagement; and then one screws on the nut to cause said movable jaw to clamp the rim between itself and the other jaw.

As shown in Figs. 1, 2, 3, 5 and 6, the clamping devices are mounted on the ends of the spokes of a wheel which has no felly. But as shown in Figs. 8 and 9 they are mounted on the felly of a wheel. As shown in Figs. 5 and 6 the jaw 15 has a shank 17 in which is a rectangular hole which fits the adjacent part of the bolt body which is movable in said hole to the extent and in the manner indicated by Figs. 5 and 6. In the constructions shown in Figs. 5 and 6, and in Fig. 9, the tightening up of the nut moves the bolt into such position that it necessarily causes the jaw 15 to occupy the clamping position. Attention is also called to the fact that the bolt is slightly tapering from end to end, being narrowest adjacent to the movable jaw. While this is not necessary, it facilitates the endwise jaw releasing movement of the bolt, and it also causes a slight outward movement of the movable jaw as the bolt is pulled through the hole in the jaw shank.

It may be desirable that the rim have such engagement with the wheel that it will be positively prevented from traveling circumferentially relative to the wheel when in use. To accomplish this, the rim may be provided with one or more lugs 61 which project inward from its inner periphery, and the wheel, that is, the felly or spoke, as the case may be, may be formed with a groove or grooves 14 for the reception of such lug or lugs.

Having described my invention, I claim:

1. In combination with a vehicle wheel, and, for the purpose of holding a demountable rim thereon, a plurality of clamping devices mounted on said wheel each comprising a jaw which projects out beyond the periphery of the wheel for engaging with one side of the rim, a movable jaw which is movably mounted on said wheel and is movable radially thereon from the clamping position in which it is adapted to engage the opposite side of the rim to the rim releasing position in which it does not project beyond the inner periphery of said rim, and vice versa, a bolt which is disposed transversely with respect to the wheel and is supported thereon, the said bolt and wheel having shoulders which may engage and which when in engagement prevent movement of the bolt toward the axis of the wheel, and said clamp and bolt having shoulders which may engage and which when in engagement prevent the movement of the clamp relative to the bolt and toward the axis of the wheel, one of said three parts, viz.: movable clamp, bolt and wheel, being capable of such movement relatively to the others as will cause the disengagement of one or the other of said two pairs of shoulders, and means to hold the parts in such position that both pairs of shoulders are in engagement.

2. The combination of a vehicle wheel, and, for the purpose of securing a demountable rim thereon, a plurality of rim retaining devices mounted on said wheel, each comprising a clamping jaw which projects out beyond the periphery of the wheel for engagement with the demountable rim, a movable jaw having a shank in which is a radially extended slot, a bolt which is disposed transversely with respect to the wheel and is supported thereon and is movable endwise and which projects through the slot in the shank of the jaw, said bolt having an enlarged body portion which may enter the slot in said jaw shank and engage the outer end of said slot, and said bolt also having a threaded stem whose outer surface is nearer the axis of the wheel than is the outer surface of the enlarged body portion of said bolt, and a nut on the threaded stem of said bolt.

3. In combination with a vehicle wheel, and for the purpose of securing a demountable rim thereon, of a plurality of rim retaining devices mounted on said wheel each comprising a clamping jaw which projects out beyond the periphery of the wheel for engaging with one side of said rim, a movable jaw having a shank in which is a hole, a bolt which is movable endwise transversely of the wheel and which has a threaded stem that projects through and beyond the shank of said jaw and also has an enlarged body which when the movable jaw is in the clamping position projects into the hole in said jaw shank and thereby holds the jaw in the clamping position, but which will be moved out of said hole by the endwise movement of said bolt toward the other jaw, the body part of said bolt being tapered and being smaller at the end which enters the hole in the jaw shank.

4. The combination of a rimless vehicle wheel which comprises a hub and a plurality of spokes, and, for the purpose of securing a demountable rim thereon, a plurality of rim retaining devices mounted respectively on certain spokes, each of said rim retaining devices comprising a clamping jaw which projects out beyond the end of the supporting spoke for engagement with said demountable rim, a movable jaw having a shank whose inner surface is concave and fitted to the convex outer surface of the spoke, there being a radially elongated hole in said shank, a bolt which passes through said spoke and through said elongated slot in said shank and which has a projecting threaded stem, there being on said bolt behind said threaded stem a portion of the body which extends outward beyond said threaded stem and is adapted to enter and engage the outer end of the slot in said shank, and a nut on said threaded stem.

5. The combination of a vehicle wheel, and, for the purpose of securing a demountable rim thereon, a plurality of rim retaining devices mounted on said wheel, each comprising a jaw which projects beyond the periphery of the wheel for engagement with said demountable rim, a movable jaw having a shank which is movable radially in contact with the opposite side of said wheel and has a radially elongated rectangular hole through it, a bolt which is slidable endwise in and transversely of said wheel and which has a head at one end, a threaded stem at the other end, and a radially elongated rectangular body portion which may project into the rectangular slot in said jaw shank and engage the outer end thereof, and a nut on said threaded stem to prevent such relative movement of the bolt and jaw shank as will enable the movement of said body portion of the bolt out of said elongated slot.

6. The combination of a vehicle wheel, and, for the purpose of securing a demountable rim thereon, a clamping jaw mounted on the wheel and projecting beyond its periphery for engagement with one side of a demountable rim, a coöperating clamping jaw mounted on the wheel and movable toward and from the demountable rim and movable also toward the axis of the wheel, means movable into and out of engagement with said movable clamp to prevent such movement toward the axis of the wheel, and clamping means which act to hold said means in engagement with said clamping jaw and to also move said clamping jaw toward the opposed clamping jaw and the interposed demountable rim.

In testimony whereof, I hereunto affix my signature in the presence of two witnesses.

STEWART R. McKAY.

Witnesses:
E. L. THURSTON,
A. J. HUDSON.